May 23, 1972     J. W. WILLIAMS III, ET AL     3,664,690

SLIP-TYPE EXPANSION JOINT AND PACKING JOINT

Filed Sept. 9, 1970

INVENTORS.
JAMES W. WILLIAMS, 3RD.
JOHN S. FETTEROLF

BY *Jackson, Jackson and Chovanes*

ATTORNEY.

United States Patent Office 3,664,690
Patented May 23, 1972

3,664,690
SLIP-TYPE EXPANSION JOINT AND
PACKING JOINT
James W. Williams III, 705 Whites Road, Lansdale, Pa. 19446, and John S. Fetterolf, 750 Spruce St., Royersford, Pa. 19468
Filed Sept. 9, 1970, Ser. No. 70,639
Int. Cl. F16l 17/02
U.S. Cl. 285—96  6 Claims

ABSTRACT OF THE DISCLOSURE

A packing joint has an inner circular member or sleeve, and an outer tubular member engaging the outside of the inner member or sleeve, slidable and telescoping with respect to the inner member, for example, as in a slip-type expansion joint. A stuffing box is at one end of the outer member, having an annular packing space between the inner and outer members open at one end, and a packing gland surrounds and engages the inner member and has a sleeve entering the packing space and enclosing the open end of the packing space. The gland is urged toward the packing space by suitable means such as screws. There is a preformed annular packing in the packing space which engages the inner member and extends in outside diameter substantially less than the outside diameter of the packing space. Plastic packing fills the packing space radially outside the preformed annular packing and in the recesses of the preformed annular packing. The gland, suitably by means of an annular tongue on the end, engages the outside diameter of the packing space, and applies hydraulic pressure to the preformed packing, the tongue being of an inside diameter at least as large as the outside diameter of the preformed packing, so that it does not bear directly on the preformed packing. The annular tongue preferably has an annular wedge surface on its radial inside adjoining its forward end. In a preferred embodiment pump means insert supplementing plastic packing, preferably at a plurality of points around the circumference.

DISCLOSURE OF INVENTION

The invention relates to slip-type expansion joints in which an inner and outer telescoping member move relatively, and to improved packing glands applicable for example to such expansion joints.

A purpose of the invention is to place preformed packing such as braided packing rings in the radial interior of the stuffing box, contacting the inner circular member or sleeve. Around this preformed packing is placed plastic packing. The gland which closes the open end of the stuffing box applies pressure directly to the plastic packing and through it to preformed packing, but does not directly deform the preformed packing. Accordingly, the pressure is applied by the tongue on the end of the gland, of a diameter too large to contact the preformed packing.

A further purpose is to provide an annular wedge on the forward inside end of the tongue.

A further purpose is to improve packing gland designs.

A further purpose is to effect a seal between the movable sleeve and the body of a slip-type expansion joint without excessive pressure and without shearing action on the preformed packing rings.

A further purpose is to improve the design of packing gland to make it provide compression uniformly to the preformed packing rings of a stuffing box.

A further purpose is to apply hydraulic pressure rather than mechanical force on preformed packing rings to achieve compression of the packing.

A further purpose is to use improved preformed and plastic packing formulations which will reduce the friction between the slidable sleeve and the body of an expansion joint.

A further purpose is to simplify slip-type expansion joints by using preformed packing.

A further purpose is to permit insertion of plastic packing more easily without shutting down the piping system.

A further purpose is to minimize the chance of sleeve collapse during the introduction of plastic packing, overcoming a problem in older designs.

A further purpose is to introduce plastic packing along the longitudinal axis of the stuffing box to effect compression of the packing without danger of sleeve collapse.

A further purpose is to reduce the size of fittings required for the introduction of plastic packing by first introducing plastic packing into the stuffing box itself, and then introducing supplemental plastic packing by a pump or the like.

A further purpose is to reduce the danger of blowback by using packing rings of preformed backing in the stuffing box to seal the entrance of the pump discharge channel.

Further purposes appear in the specification and the claims.

In the drawings we have chosen to illustrate a few only of the numerous embodiments in which our invention may appear, choosing the forms shown from the standpoints of satisfactory illustration, convenient construction and simple exemplification of the idea of the invention.

Figure 1:
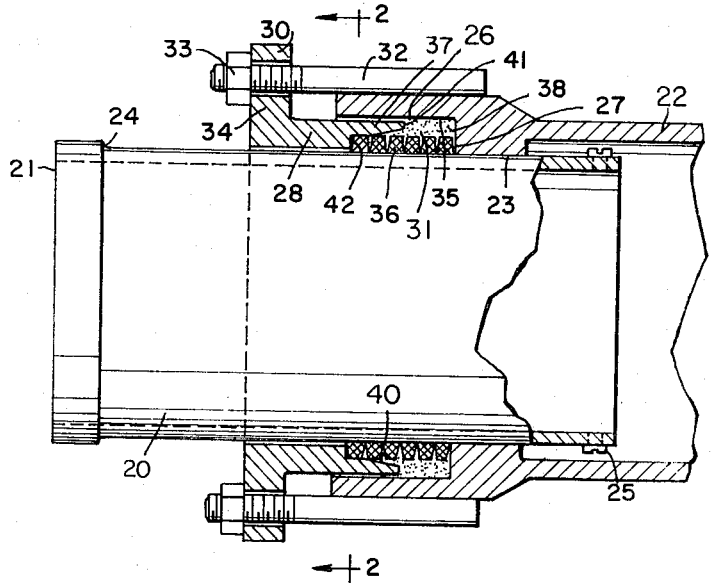
FIG. 1 is an axial section of an expansion joint showing the principles of the invention.
Figure 3:
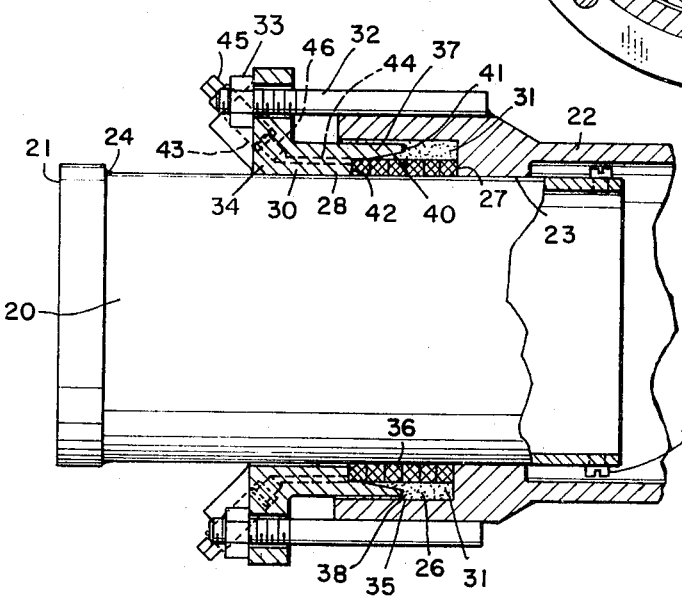

FIG. 3 has a view similar to FIG. 1 showing a modification of the device of the invention. This figure shows two guns or pumps to inject plastic packing but one is really slightly in front of the point of sectioning, since they are at opposite points on the diameter.

The invention relates to a slip-type expansion joint which has a slideable inner sleeve and an outer tubular housing telescoping with respect to the inner sleeve and engaging it, the two moving relative to one another to absorb the expansion and contraction of piping or the like due to changes in the temperature. The sleeve surface is usually polished and frequently chrome plated to reduce the friction between the packing material in the stuffing box, between the housing and the sleeve, and the sleeve itself. More recently preformed or braided packing rings of asbestos impregnated with a suspension of polytetrafluoroethylene (Teflon) suspensoid have been developed which reduce the friction by the self-lubricating property of the Teflon.

Slip-type expansion joints on the market are generally of two types. The simplest and least expensive form uses a packing gland to seal the body and sleeve. This is typically shown in McKee U.S. Patent 1,872,088, granted Aug. 16, 1932 for Expansion Joint, and McKee U.S. Patent 1,872,089, granted Aug. 16, 1932 for Expansion Joint.

In this type of expansion joint, several preformed packings rings are put in the stuffing box, generally square in cross-section. The gland compresses the packing to obtain a satisfactory seal on the inner sleeve. Glands typically have a cylindrical sleeve or extension which slides into the stuffing box area and contacts the end of the packing ring which is outermost in the stuffing box. Tightening the nuts engaging the body bolts or studs forces the sleeve or extension of the gland into the stuffing box and compresses the packing.

Expansion joints of this type are low in cost and generally free from maintenance problems. However, continual tightening of the gland during service compresses the packing to such an extent that additional packing rings must be inserted. Under these conditions the pipeline must be shut down, pressure on the system relieved and the gland removed in order to insert additional packing rings needed to reseal the joint.

The second kind of slip-type expansion joints currently used uses preformed asbestos packing rings in combination with plastic packing in a stuffing box of more intricate design. The predecessor of these devices is shown in McKee U.S. Patent 1,953,493, granted Apr. 3, 1934 for Stuffing Box and Method for Packing the Same; Yarnall U.S. Patent 1,960,041, granted May 22, 1934 for Check Valve; McKee U.S. Patent 1,989,644, granted Jan. 29, 1935 for Stuffing Box and Packing Therefor and Yarnall and Kinderman U.S. Patent 2,840,118, granted June 24, 1958 for Check Return Fitting. These joints as commercially made at the present time utilize a space between two sets of preformed packing rings to allow initial placement of plastic packing during assembly of the expansion joint and the introduction of additional plastic packing through external pumps or screw-type plungers. Radial bosses on the gland receive a number of these pumps or plungers which discharge packing directly into the plastic packing chamber. The discharge openings for the pumps or plungers are designed with lips to prevent blowback of hot packing when the plunger is removed for additional packing.

The plastic packing generally consists of a fibrous heat-resisting material such as asbestos, lubricating oil and a selected fine solid material to fill the voids in the braided asbestos rings, suitably soapstone, graphite, mica or the like. The plastic packing is a relatively dense mixture which has sealing properties, but under very high pressure exhibits plastic flow.

In assembling stuffing boxes using this type of packing the gland was mechanically compressed on the braided or preformed packing rings, and then hydraulic pressure was built up in the packing space by inserting plastic packing by means of the packing plungers.

The present invention combines the advantages of a gland packed stuffing box and also uses plastic packing to make improved sealing of the sleeve element. By eliminating severe distortion of the preformed packing rings by mechanical compression, longer life of the packing is assured.

Figure 2:
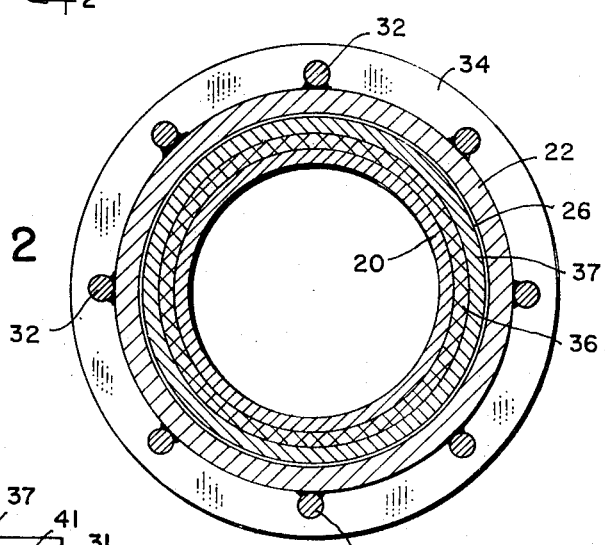
FIG. 2 is a section of FIG. 1 on the line 2—2.

FIGS. 1 and 2 illustrate a sleeve 20 which is connected to the piping as by welding at 21 and suitably has an exterior surface which is precisely machined and preferably chrome plated so as not to damage the packing. This is surrounded and guided by a body 22 which at the other end is joined to the piping as by welding, and which engages the sleeve 20 at surfaces 23 to guide it as the expansion joint adjusts longitudinally. The relative motion of the sleeve 20 with respect to the body is limited at one end by shoulder 24 and at the other end by stops 25.

At the end of the body there is a stuffing box 26 formed by a shoulder 27 on the body, which is open to the cylindrical extension or sleeve 28 of packing gland 30. In the stuffing box there is a packing space 31 which contains packing which seals the sleeve 20 to the body 22.

The packing gland 30 is tightened by studs 32 on the body on which are threaded nuts 33 acting on a flange 34 of the packing gland and provided with suitable openings for the studs.

Engaging the sleeve 20 on the inside and substantially clear from the cylindrical wall 35 of the stuffing box are a succession of preformed packing rings 36 suitably of braided asbestos with or without Teflon. On the forward end of the packing gland there is an annular tongue 37 which is of a diameter to engage the outside of the packing space at 35 but on the inside is too large in diameter to cause damage to the preformed packing rings, but suitably on the inside rides just outside them or against them.

Radially outside of the packing rings 36 in the stuffing box is plastic packing 38 which is engaged by the tongue 37 and subjected to pressure, and through this pressure hydraulically compresses the packing rings 36 and also forces the plastic packing into any recesses between the packing rings. The compression of the plastic packing is aided by an annular wedge surface 40 on the inside of the forward end of the tongue 37 on the gland, ending in a blunt end 41 of the tongue at the forward end. It will be evident that there is additional space beyond that occupied by the preformed braided packing rings which is filled with a quantity of plastic packing around the perimeter of the packing rings.

The tapered or wedge portion of the gland tongue gradually forces the plastic packing downward against the packing rings and into the space between the rings. Thus there is some initial compression of the preformed packing rings prior to contact of the outer packing ring with the end 42 of the gland.

In this stuffing box the initial seal is formed, not by severely deforming the preformed packing rings as in conventional designs, but by forcing the plastic packing into any existing voids as well as against the packing rings or between them. The compressive forces exerted on the packing rings are substantially uniform along the length of the stuffing box in sharp contrast to a conventional gland packed stuffing box where the highest compressive force is against the outer ring with only a small available force to compress the inner ring.

The basic principle employed is change in volume of the plastic packing chamber to effect sealing with the aid of the plastic packing rather than the injection of additional packing to eliminate voids during assembly and service.

Thus in this embodiment the tapered tongue replaces the pump or plunger, and provides compressive force directly upon the plastic packing and transferred to the preformed annular packing surrounding the sleeve.

In FIG. 3 we show a modification in which threaded cylinders 43 are distributed around the gland flange 34, and provided with passages 44 for feeding plastic packing longitudinally of the gland sleeve into the packing space. The cylinders 43 contain at the rearward ends threaded plungers 45 which bring pressure on plastic packing 46. The plungers and cylinders need not be in the gland, though they are conveniently located there. In the joint of FIG. 3, the gland is capable of applying pressure to the initial filling of plastic packing, but when the packing becomes worn, it is possible to supplement the plastic packing through the openings in the gland from the plungers.

In operation of the device of the invention, the sleeve and body are joined to the piping. The packing space on the inside is occupied by a succession of preformed plastic rings, and on the outside it is occupied by plastic packing. The gland is tightened to the predetermined point at which it applies pressure to the plastic packing and then eventually the end of the gland engages the outermost preformed packing ring.

In the form of FIG. 3 supplemental plastic packing can be inserted, and since the passages 44 engage the end of the outermost preformed ring, which will prevent blowback, it is possible to remove the plungers and insert more plastic packing as desired.

The gland is tightened so as to effect uniform pressure on the preformed packing rings directly, and also pressure on the plastic packing by the tongue. Thus the packing is subjected to a combination of mechanical force and hydraulic pressure.

It will be seen that the effect of the annular wedge 40 is equal around the circumference, and thus applies pressure to the plastic packing equally, and does not present a danger of collapsing the sleeve. Also, in the form having plungers by using multiple plungers equally circumferentially placed, the danger of collapsing the sleeve is also reduced. Blow-back through these plungers is rendered difficult because the openings 44 contact the end of the preformed packing, thus reducing the back pressure.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. A packing joint having an inner circular member, an outer tubular member engaging the outside of the inner member, slidable and telescoping with respect to the inner member, a stuffing box at one end of the outer member, having an annular packing space between the inner and outer members open at one end, a packing gland surrounding and engaging the inner member and havig a sleeve entering the packing space and closing the open end of the packing space, the packing gland having capability of further takeup when assembled, and means for applying pressure on the packing gland toward the stuffing box, characterized by the improvement which comprises preformed annular packing in the packing space engaging the inner member and extending to the outside diameter substantially less than the outside diameter of the packing space, plastic packing filling the packing space radially outside the preformed annular packing, and an annular tongue on the end of the packing gland entering the packing space, engaging the outside diameter of the packing space, said tongue being of an inside diameter at least as large as the outside diameter of the preformed packing, avoiding direct pressure on the preformed annular packing while applying pressure on the plastic packing and by it on the annular preformed packing.

2. A packing joint of claim 1, in which said annular tongue has an annular wedge surface on its radial inside adjoining its forward end.

3. A packing joint of claim 2, in combination with pump means communicating with the inside of the packing space for applying hydraulic pressure to plastic packing in the packing space, and plastic packing filling the pump and communicating with the packing space.

4. A packing joint of claim 3, in which said pump means communicates with the inside of the packing space through a passage in the gland sleeve, and said passage enters the packing space in line with the preformed annular packing and not outside thereof.

5. A packing joint of claim 1, in combination with pump means communicating with the inside of the packing space and applying hydraulic pressure of plastic packing in the packing space, and plastic packing filling the pump means and communicating with the packing space.

6. A packing joint of claim 5, in which said pump means communicates with the inside of the packing space through a passage in the packing gland and enters the packing space in line with the preformed annular packing and not outside thereof.

References Cited

UNITED STATES PATENTS

| 2,323,179 | 6/1943 | Hall et al. | 285—356 X |
| 1,914,741 | 6/1933 | Gysling | 285—96 |
| 1,844,903 | 2/1932 | Queen | 277—72 FM |
| 2,188,302 | 1/1940 | Pfefferle | 285—356 X |
| 808,922 | 1/1906 | Herrick | 285—356 X |
| 993,774 | 5/1911 | Greenlaw | 285—356 X |
| 2,210,826 | 8/1940 | Williams | 285—356 X |
| 2,027,653 | 1/1936 | Roye | 285—94 |
| 1,800,085 | 4/1931 | Kroeger et al. | 285—96 |

THOMAS F. CALLAGHAN, Primary Examiner

U.S. Cl. X.R.

277—72 FM, 101; 285—356